United States Patent
Rodriguez et al.

(10) Patent No.: US 6,427,149 B1
(45) Date of Patent: Jul. 30, 2002

(54) REMOTE ACCESS OF ARCHIVED COMPRESSED DATA FILES

(76) Inventors: Herman Rodriguez, 4201 Love Bird La., Austin, TX (US) 78730; Cornell G. Wright, Jr., 6208 Edwards Mountain Cove, Austin, TX (US) 78731

( * ) Notice: Subject to any disclaimer, the term of this patent is extended or adjusted under 35 U.S.C. 154(b) by 0 days.

(21) Appl. No.: 09/393,084

(22) Filed: Sep. 9, 1999

(51) Int. Cl.[7] .............................................. G06F 17/30
(52) U.S. Cl. ...................... 707/10; 707/101; 709/213; 709/217; 709/219
(58) Field of Search .............................. 707/204, 200, 707/10, 101; 709/217, 219, 213

(56) References Cited

U.S. PATENT DOCUMENTS

| | | | | |
|---|---|---|---|---|
| 5,802,520 A | * | 9/1998 | Jerkunica et al. | ........... 707/101 |
| 5,923,846 A | * | 7/1999 | Gage et al. | .................. 709/213 |
| 6,047,318 A | * | 4/2000 | Becker et al. | ............... 709/217 |
| 6,049,892 A | * | 4/2000 | Casagrande et al. | .......... 714/18 |
| 6,223,224 B1 | * | 4/2001 | Bodin | ......................... 709/236 |

OTHER PUBLICATIONS

L. Peter Deutsch, "GZIP File Format specification version 4.3", Request for Comment 1952, 13 pages, May 1996.
NetZIP Web 6.52 Internet posting, 3 pages, Aug. 20, 1999, http://www.netzip.com/products/Info_Netzip_Win.html.
Browse and Zip V.1.5 Internet posting, 2 pages, Nov. 6, 1998, http://www.canyonsw.com.
DR–LiNK summary from http://www.mnix.net/drlink4f/drlink4.cgi, 2 pages, "Easier Unzipping", Information Week Issue 704, p. 200, Oct. 20, 1998.
Press Release for ZIP–IT 4.0 from Quarterdeck Corp., 3 pages, Sep. 29, 1997, posted on Internet at http://www.quarterdeck.com.

* cited by examiner

Primary Examiner—Kim Vu
Assistant Examiner—Hung Q Pham
(74) Attorney, Agent, or Firm—Robert H. Frantz; David A. Mims, Jr.

(57) ABSTRACT

The method disclosed and a system employing the method provide remote access via a computer network to individual files contained within a multi-file archive file on a computer network file server, such as ZIP files stored on an Internet web server. The method allows a user equipped with a standard web browser to view a listing of the files contained within an archive file prior to actually downloading the archive file. The user can then select one or more files to receive or download, and the web server extracts only the selected files for transmission to the client computer. The method particularly reduces the amount of time, network bandwidth and computer storage necessary to view the file listing, and to download the selected files.

22 Claims, 5 Drawing Sheets

*Prior Art*

REMOTE ACCESS OF ARCHIVED COMPRESSED DATA FILES

BACKGROUND OF THE INVENTION

1. Field of the Invention

This invention pertains to the arts of selective access and download of archived compressed files via computer networks such as the Internet and intranets. This invention relates in particular to standard multi-file compression archives, such as ZIP, GZIP, and CAB files, and the ability to access files contained within those archives on an individual or group basis via computer networks.

2. Description of the Related Art

As shown in FIG. 4, client/server computer systems are well known within the art, including those which are interconnected via intranets and Internets. A client computer (60) may access (61) a web server computer (64) through the Internet or "world wide web" (62) using a dial-up modem connection, cable modem, Asymmetric Digital Subscriber Loop ("ADSL"), Integrated Services Digital Network ("ISDN") or other data connection. Likewise, the web server computer (64) may interface (63) to the Internet using the same data connection options, but more commonly through much higher data rate connections such as T1 or T3 digital transmission lines. A client computer may also access a "local" web server or corporate intranet server via an intranet (65), which may be a local area network ("LAN"). A typical client computer is provided with a keyboard (81) for receiving input and commands from a user, and a display (80) for outputting information to a user, as well as optional pointing devices such as a mouse or pointing pad.

Web "browsers" are commonly used on networked client computers in order to access a web server. FIG. 5 shows the functional organization of the software and hardware components of a client computer (60) utilized when a web server is accessed to retrieve stored files. An Internet browser program (71), such as Microsoft Explorer or Netscape Navigator, communicates to a network communications protocol stack (73), such as Transmission Control Protocol/Internet Protocol ("TCP/IP"). The protocol stack controls and communicates to a network interface ("NIC"), such as an Ethernet LAN interface card or a modem. The browser program (71) may store (75) files which have been downloaded from servers on the network on the system hard drive(s) or in system memory (76).

Various file archive and compression methods and systems are well known within the arts of computer and networking technology. Public standards or conventions for the compression and archiving of data files such as "ZIP" files are available, as well as certain proprietary formats such as the Microsoft "cabinet" file format.

A zip file may contain only one compressed data file or multiple data files. The Internet request for comment ("RFC") 1952, a public document, discloses in detail the format and organization of a zip file developed by the Free Software Foundation, called GZIP. FIG. 1 shows the format of a GZIP file (1), including a header section (2), the compressed data blocks (3), and a tail section (4). The header section (2) contains information to identify the file as a GZIP file in the ID1 through ID3 elements, an indication of the type of compression used (i.e. deflation, LZW, etc.) in the compression mode element, a set of flags to indicate optional parameters that may be included in the GZIP file, a record of the operating system with which the original file was compatible, the original file name, a comment possibly entered by the operator, and a CRC value. Following the header section (2) is the actual compressed file data organized in blocks (3), which is in turn followed by another CRC and a record of the original, uncompressed file size.

In order to store multiple compressed data files in a single archive file, the common technique is to repeat the sequence of elements as given in FIG. 1. This allows for individual compressed files to be extracted and decompressed without requiring all the archived files to the extracted and decompressed.

Many Internet and intranet servers provide downloadable archive files. For example, many software corporations provide downloadable demonstration copies of their products on their corporate web sites. This allows potential customers to use a web browser to select products to preview, download the demo versions, decompress or "unzip" the files and install the software products. As seen in FIG. 5, an archive and compression utility program (78) such as Pkware Incorporated's PKUNZIP may be used to retrieve an archive file from system memory or hard drive (76) and to extract and decompress the files contained therein. Alternatively, the browser program (71) may launch (77) the utility program (78) directly, or may use a browser "plug-in" (72) to extract and decompress files from the downloaded archive file.

FIG. 2 shows the typical process or method used to retrieve these archive files. An Internet or intranet client computer uses a web browser, such as Netscape Navigator or Microsoft Explorer, to select (21) a page or address on an web server to be viewed. When the address or page is selected, a series of commands and responses (22) are exchanged between the web server and the web browser via the Internet or an intranet. This type of "web browsing" is well known within the art.

The web server accesses (23) the requested web address or web page, and returns (24) one or more web objects, typically in the form of Hypertext Markup Language ("HTML") documents, JAVA scripts, and graphics files such as Compuserve Graphics files ("GIF") and Joint Photographics Experts Group ("JPEG") files. The operator of the web browser reviews the web page which he or she has received, and selects (25) a hyperlink which points to an archive file such as a ZIP file. The operator may be presented with a choice to download and save the file to the client computer's disk drive, or to download the file and immediately launch an application associated with the file, such as PKUNZIP from Pkware, Inc.

Then, a request (26) is made to the web server to download the indicated archive file. In response to this request (26), the web server accesses (27) the entire archive file and begins transmitting this file to the web browser via the computer network. If the archive file is large in size relative to the data transfer rate between the web server and the client computer, the download may require several minutes to hours to complete.

Finally, after the entire file has been downloaded, the file is either saved (31) or the file is "opened" (33) using the registered application program, such as PKUNZIP, on the client computer. If the archive file contains multiple compressed files, the operator is presented for the first time during the process with a list of the contained file names, lengths, and comments as the utility program extracts and displays those elements from the archive file. The operator can then selectively extract and decompress one or more of the multiple files as desired.

The problems that arise with this process are the time required to retrieve just one or a few of the files contained in the archive file, and the disk space consumed by the storage of unwanted files. With the prior art method, an operator may ultimately only desire to access one small file that is contained in a much larger multi-file archive file. But, in order to access the individual file, the operator may have to download the entire archive file and then extract and decompress the single file contained within. This means that the operator may have to wait for several minutes to hours to receive a file contained within an archive file, which, if transmitted individually, may only require a few seconds to minutes to download. This repeated many times a day or week, and multiplied by many users on a network (such as a corporate LAN or intranet) accumulates to considerable wasted human operation hours as well as significant wasted computer network bandwidth, disk storage and memory.

Therefore, there exists a need in the art for a method to selectively retrieve compressed data files over computer networks which are stored within multiple-file archive files. There further exists a need in the art for this method to provide the user with a listing of the files available within an archive file without requiring a full download of the actual archive file, and to do so in a timely manner to minimize operator wait time. Finally, there exists a need in the art for this method to be realizable and compatible with existing equipment and software commonly used for computer network communications and browsing, and to minimize the need for special software or hardware to practice the method.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The method disclosed herein provides the capability of a standard Internet browsing utility such as Netscape's Navigator or Microsoft's Explorer, to display the contents of a web-stored archive file and to selectively download compressed files from within the archive file without the need for a special browser "plug-in" and without the need to download the entire archive file. By providing file listing and extraction fimctions on the web server, and by delivering the file listing to the browser using a common and standard interface such as HTML, the method can be realized using common technology on web servers and without need for changes to or additions to millions of client computers' software.

DETAILED DESCRIPTION

The method of the invention relies upon changes to the web server only, and does not necessarily require special modifications to the client computer software, browsers, or hardware. Primarily, a number of software functions are added to the web server functionality, such as a software function to extract a listing of file names and file comments from archive files, and a software function to generate an HTML document containing this information with hyperlinks to indicate specific files to be downloaded. Also, a function to extract an individual or group of compressed files from an archive file is added to the web server. These kinds of functions can be custom developed relying upon knowledge within the art, or by using source code commonly available from sources such as the Free Software Foundation. These functions may also be purchased from vendors of compression and archive utilities, such as Pkware, Inc.

Figure 1:
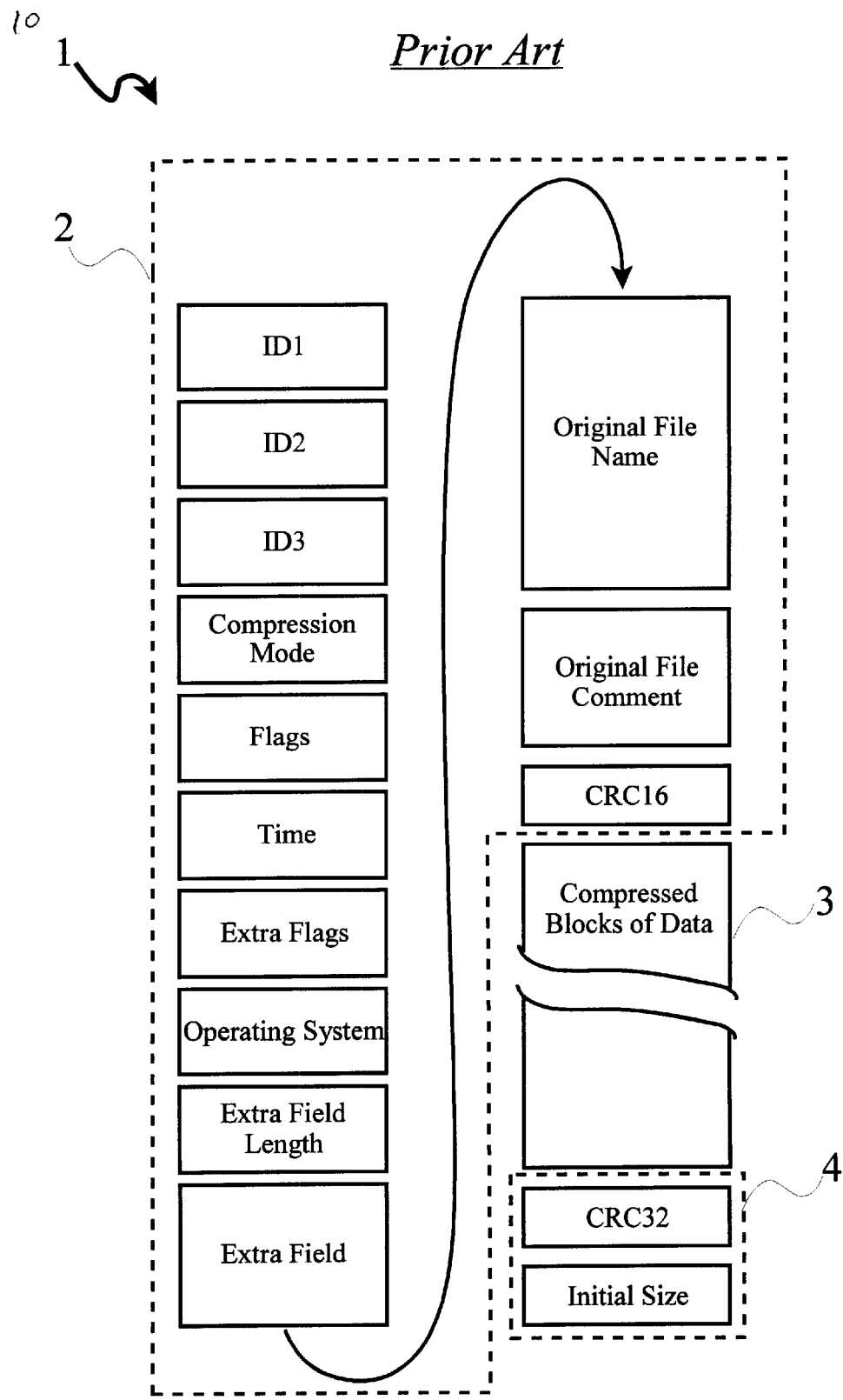
FIG. 1 discloses an archive file format which is well known within the art, and is exemplary of other archive file formats which are also known within the art.
Figure 2:
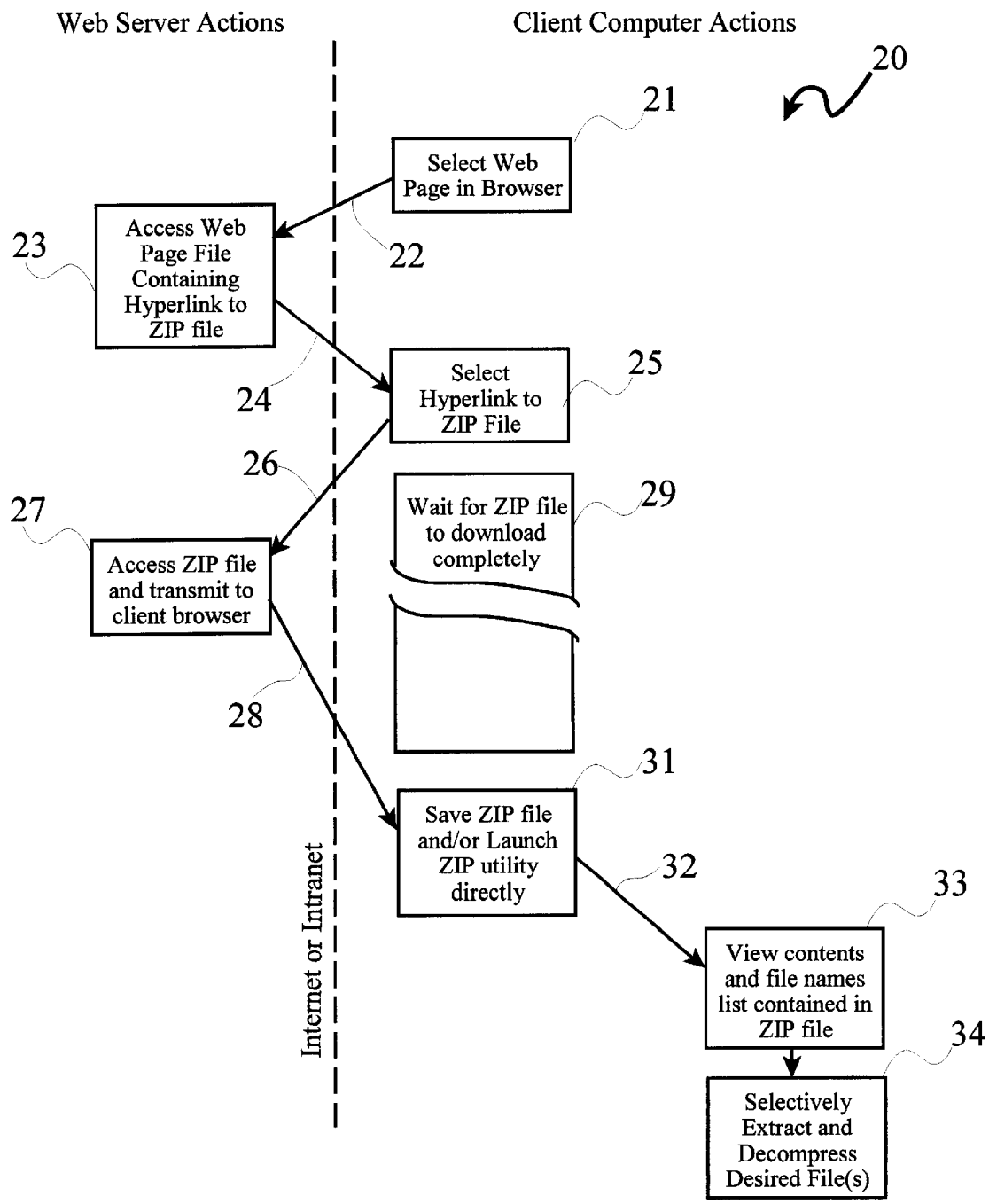
FIG. 2 illustrates a typical method followed for accessing, downloading, and selectively extracting and decompressing files from archive files which are stored on computer network servers.
Figure 3:
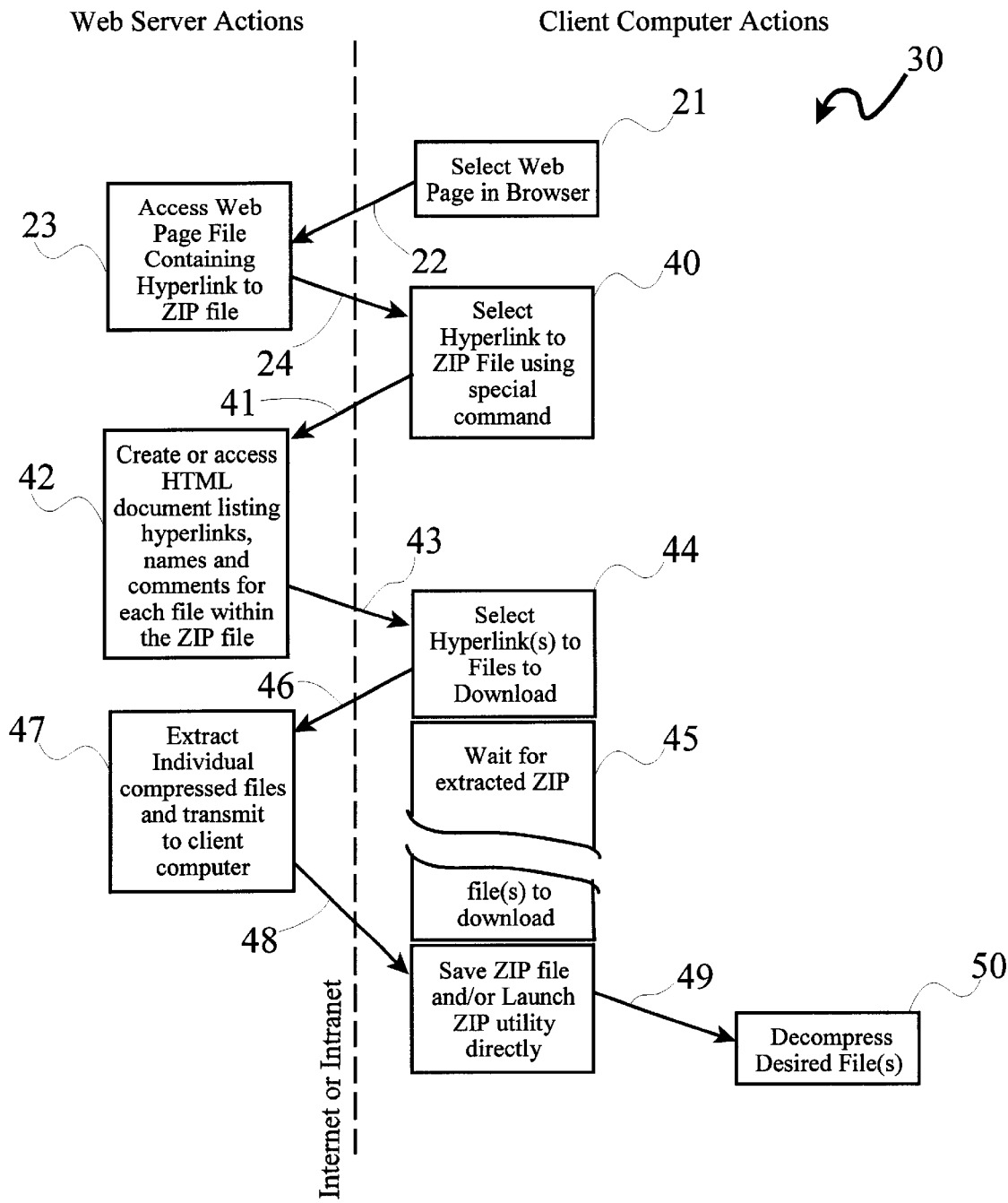
FIG. 3 sets forth the method of the invention which allows the contents of the archive file to be viewed prior to downloading any compressed data, such that individual files can be selected and downloaded, thereby avoiding wasted time and computer network bandwidth required to download undesired files within the archive file.
Figure 4:
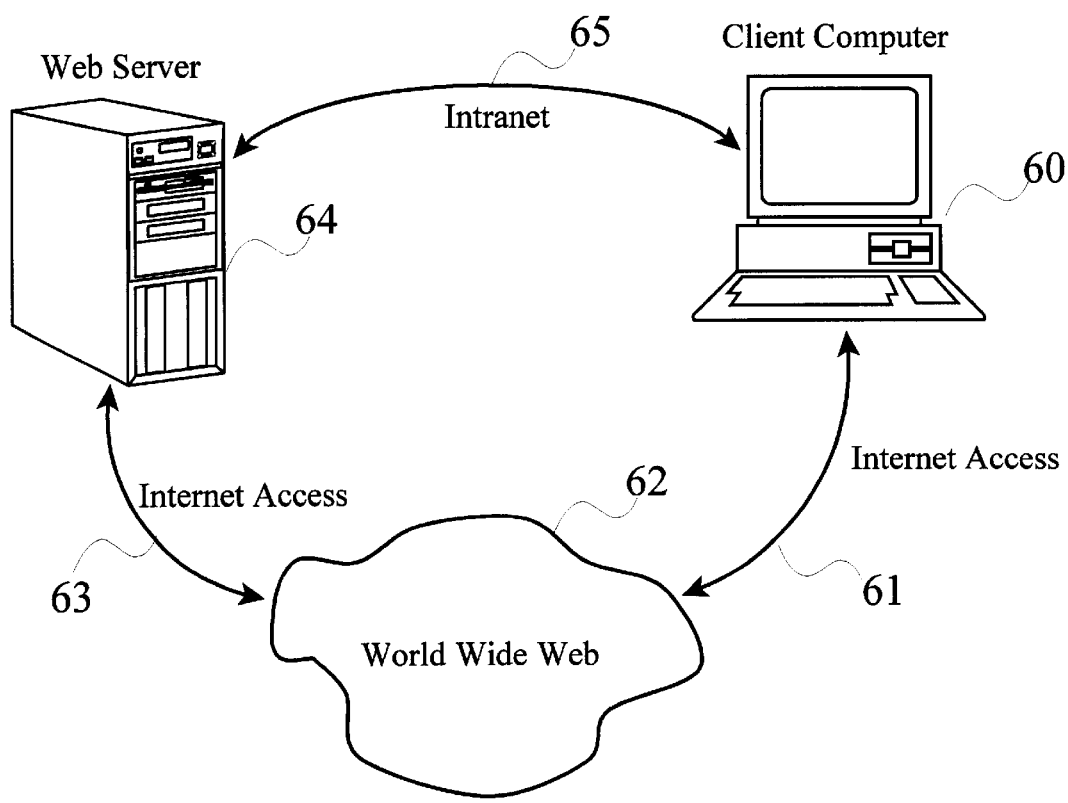
FIG. 4 shows the general arrangement of client computers, web servers, intranets and the Internet.
Figure 5:
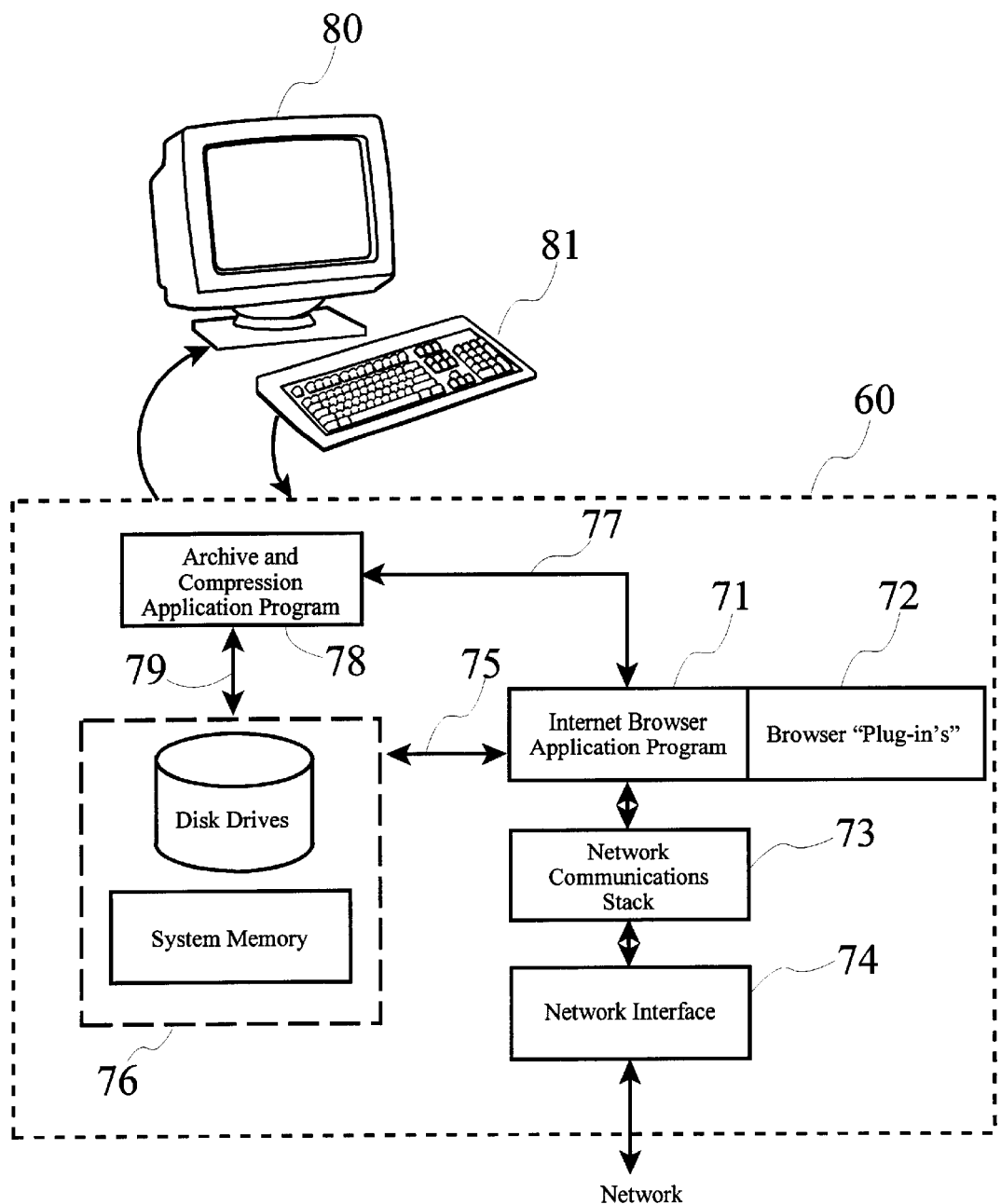
FIG. 5 illustrates the functional organization of software and hardware components of a client computer used when accessing files via a network.

Turning to FIG. 3, the variation in the steps taken from the typical process as shown in FIG. 2 is evident. As in the typical process, the user selects (21) a web page to view using a web browser such as Explorer or Navigator. This results in a request (22) to the web server to receive the web page. The web server then accesses (23) all of the web objects required by that page, such HTML documents, JAVA scripts, and graphics files, and transmits (24) those objects to the browser over the computer network, such as the Internet or an intranet. This web page contains one or more hyperlinks to archive files, such as a ZIP file.

The user then selects a hyperlink (40) which refers to an archive file, and results in a special request (41) to the web server for a listing of the contents of the archive file rather than a request to directly proceed to downloading the entire archive file. This special request can be as simple as a second hyperlink on the original web page:

Click here to download the entire ZIP file, or

Click here to view the contents of the ZIP file where hyperlinked text is underlined following Internet page conventions, and where the first hyperlink refers directly to the ZIP file itself (the traditional method). Likewise, the second hyperlink refers to an existing file listing or a request to create and transmit a file listing.

To follow the conventional method to download the entire archive file, the user would click on the first hyperlink, as indicated in the process of FIG. 2. However, if the user preferred to view a listing of files contained within the archive file, the user would click on the second hyperlink. This would result in a special request, preferably in the form of a hyperlink, being transmitted (41) to the web server from the client computer. The web server would then use the file list function and dynamic web page creation functions described supra to create (42) a web page containing a list of the files contained within the archive file. The web page would also contain hyperlinks to individual file names, which would allow the user to indicate which files to extract and download. Alternatively, the file listing web page may already exist, and it may be stored or accessible by the web server.

In an enhanced embodiment, this step may include the transmission of a password dialog page, in the form of HTML or a web form, to collect and verify a password from the user prior to transmitting the file listing.

In a further enhanced embodiment, the file listing may include icons next to or near each file name in the listing such that the user can quickly identify the types of files listed, such as word processor files, video clips, and spreadsheets. This feature may be realized by the web server including these icons in the form of Compuserve graphics ("GIF") files to the HTML document for the file listing, which eliminates the need for the client to have the associated icons stored on the client computer.

The file listing page is then transmitted (43) to the browser on the client computer, where the user reviews the list, and selects (44) one or more files for reception. This results in one or more requests being transmitted (46) to the web server in the same manner that previous requests for data have been transmitted in the method. The web server responds by executing (47) the file extraction utilities to extract and optionally decompress the selected files from the archive file. Those extracted files are then transmitted (48) to the client computer or network client, where they are saved (49) and/or decompressed (50) by the appropriate software application. The time (45) spent waiting for the transfer to complete using this method is substantially reduced compared to the conventional method as the total data volume to be downloaded is reduced, and as unwanted data is not downloaded at all.

For files which were selected to be extracted and decompressed by the web server prior to transmission to the client computer, the proper application program on the client computer which is registered to that file type may be optionally launched to allow immediate operation on the file after it is received. For example, if the file is an Apple Quicktime video clip, the proper Apple viewer could be launched. Or, if the file were a Lotus WordPro word processor document, Lotus WordPro would be launched. The method of using file name extensions to associate files with and cooperatively launch the application is well understood in the art, and similar functionality is found in most personal computer operating systems.

The use of a standard HTML document to communicate the file list and to provide selection command interface to the user avoids the need for a special plug-in or modification to the existing browser software, and enables it to be compatible with all standard web browsers. Finally, the dynamic creation of the file listing page minimizes web server storage requirements, which is often a complementary requirement on servers which are storing compressed archive files.

The method and system described herein is preferably implemented on a web server system based on an IBM RS6000 computer platform running a suitable web server suite, such as the IBM AIX operating system and the IBM WebSphere Application Server product. Alternative computer platforms, web server software, and operating systems such as Microsoft NT or IBM OS/2, and IBM-compatible personal computers or Sun workstations, can be utilized, as well.

The functions for the web server to list archived files and selectively extract compress files from archive files are preferably part of the Data Compression Library available from Pkware, Inc.

It will be understood from the foregoing description that various modifications and changes may be made in the preferred embodiment of the present invention without departing from its true spirit, such as the use of alternate web server platforms, operating systems and archive file management utilities. It is intended that this description is for purposes of illustration only and should not be construed in a limiting sense. The scope of this invention should be limited only by the language of the following claims.

What is claimed is:

1. A method for remote selective access of one or more files stored within an archive file on a server computer using a client computer over a computer network, said archive file containing two or more individual files, said archive file further maintaining fill original identity information for each individual file contained within it including original file names, said method comprising the steps of:

transmitting a list of said individual file names contained within said archive file to said client computer, said list containing a first input selection for at least one individually selectable downloadable individual file contained within said archive file;

receiving a selection from client computer using said first input selection for at least one individually selectable downloadable individual file;

extracting said selected individual file or files from said archive file on said server computer; and transmitting said extracted file or files to said client computer via said computer network thereby avoiding the necessity to store said files individually on said server computer, and avoiding the necessity to download the entirety of said archive file.

2. The method of claim 1 further comprising the step of receiving a password by the server computer from the client machine as a security measure.

3. The method of claim 1 further comprising the step of displaying on a client computer display the list of files contained within said archive data file.

4. The method of claim 3 further comprising the step of displaying on a client computer display the list of files including a first input selection which is a user-selectable hyperlink.

5. The method of claim 1 further comprising the steps of:

transmitting to said client computer a second input selection associated with said list of files;

receiving a selection from said computer operator on said client computer using said second input selection; and decompressing said extracted file or files on said server computer before transmitting said extracted file or files to the client computer.

6. The method of claim 5 further comprising the step of displaying on a client computer display the second input selection.

7. The method of claim 6 further comprising the step of displaying on a client computer display the second input selection as a user-selectable hyperlink.

8. The method of claim 1 further comprising the steps of:

retrieving data from said archive file by said server computer containing information regarding the files contained within the archive file in response to receipt of said selection of said first input selection by said computer operator; and dynamically creating from said retrieved data a list of files for transmission to said client computer, and including said first input selection.

9. The method of claim 8 wherein the step of dynamically creating a list of files from said retrieved data includes the creation of at least one Hyper Text Markup Language document.

10. The method of claim 1 further comprises retrieving said list of files from a computer-readable medium.

11. The method of claim 10 wherein the step of retrieving said list of files from a computer-readable medium includes the retrieval of at least one Hyper Text Markup Language document.

12. A computer-readable medium containing instructions for a networked server computer to enable a remote client computer to selectively access one or more individual files contained within an archive file accessible by the server computer, said archive file further maintaining full original identity information of said individual files including their original file names, said instructions causing said networked server to perform the steps of:

receiving a first request from said remote client computer;

transmitting to said remote client computer a list of file names contained within an archive data file in response to receipt of said first request;

receiving a second request from said remote client computer;

extracting at least one individual file from said archive data file in response to receipt of said second request from said remote client computer; and transmitting said extracted file or files to said remote client computer thereby avoiding the necessity to store said files individually on said server computer, and avoiding the necessity to download the entirety of said archive file.

13. The computer-readable medium as described in claim 12 further containing instructions for:

receiving a third request from said remote client computer; and extracting and decompressing at least one file from said archive data file in response to receipt of said third require from said remote client computer, and transmitting at least one extracted and decompressed file to said remote client computer.

14. The computer-readable medium as described in claim 12 further containing instructions for dynamically creating said list of files after receipt of said request from said remote client computer.

15. The computer-readable medium as described in claim 14 further containing instructions for dynamically creating at least one Hyper Text Markup Language document after receipt of said request from said remote client computer.

16. A networked file server suitable for selectively transmitting individual files contained within a stored archive file, said archive file maintaining full original identity information for each individual file contained within it including original file names, said networked file server comprising:

a computer platform including a computer and an operating system suitable for executing software, said computer platform including a computer network interface for sending and receiving data over a computer network, and further including data storage means for storing data files;

a network server software package for interacting with remote client computers over a computer network;

a means for receiving a first request from a client computer over a computer network;

a means for transmitting a list of file names of files contained within said stored archive data file to said client computer over a computer network in response to receipt of said first request;

a means for receiving a second request from a client computer over a computer network;

a means for extracting at least one individual file stored in said archive file; and a means for transmitting said extracted file or files to said client machine via said computer network.

17. The networked file server as described in claim 16 further comprising a means to dynamically created at least one Hyper Text Markup Language document in response to said first require from said client computer.

18. The networked file server as described in claim 16 further comprising:

a means to receive a third request from said client computer over a computer network;

a means for decompressing at least one extracted file in response to receipt of said third request; and a means for transmitting said decompressed file or files to said client computer via said computer network.

19. The networked file server as described in claim 16 wherein said means fo transmitting said list of files to said client computer via a computer network further comprises a means to transmit Hyper Text Markup Language documents.

20. The networked file server as described in claim 19 wherein said Hyper Text Markup Language documents contain hyperlinks for user selection of files to be extracted and transmitted to said client computer via a computer network.

21. The networked file server as described in claim 19 wherein said Hyper Text Markup Language documents contain hyperlinks for user selection of files to be extracted, decompressed and transmitted to said client computer via a computer network.

22. The networked file server as described in claim 19 wherein said Hyper Text Markup Language further includes hyperlinks to graphic icon image files located on the networked file server for displaying icons related to a file type associated with each file in said list of files.

* * * * *